United States Patent Office 2,817,670
Patented Dec. 24, 1957

2,817,670

PROCESS FOR REDUCTION OF STEROID DIENES

Robert A. Donia and Byron A. Johnson, Kalamazoo, Mich., assignors to The Upjohn Company, Kalamazoo, Mich., a corporation of Michigan No Drawing. Application July 14, 1952
Serial No. 298,841

11 Claims. (Cl. 260—397.2)

The present invention relates to a novel and useful chemical process for the conversion of $\Delta^{4,6}$-3-ketosteroids to three-ketosteroids by selective hydrogenation of the double bonds in the four and six-positions.

It is an object of this invention to provide a novel and useful process for the production, in high yields, of steroids containing the three-keto grouping. A further object of this invention is to provide a novel and useful process for the production of normal three-ketosteroids, i. e., three-ketosteroids wherein the configuration at the five-carbon atom is cis. By procedures well-known in the art such three-ketosteroids can be converted to steroids containing the $\Delta^4$-3-keto grouping, a grouping which is an integral part of the steroid nucleus in physiologically active steroid hormones such as cortisone, progestrone, and testosterone. The 4,5-dihydro derivatives of the industrially important compounds cortisone, progesterone, and testosterone are among the compounds produced by the process of this invention. Allo three-ketosteroids also may be converted to steroids containing the important $\Delta^4$-3-keto grouping, for example, by procedure known in the art [Rosenkranz, Mancera, Gatica, and Djerassi, J. Am. Chem. Soc., 72, 4077 (1950)]. Illustrative of the uses of other products produced by the process of this invention is the conversion of the product 22-coproergosten-3-one (obtained from 4,6,22-coproergostatrien-3-one) to progesterone. This may be accomplished, for example, by treating the 22-coproergosten-3-one with ozone and decomposing the ozonide formed under reducing conditions to obtain 3-ketobisnor-cholan-22-al, heating the aldehyde with piperidine and removing the water formed to obtain 22-(N-piperidyl)-20(22)-bisnor-cholen-3-one, ozonizing the aminoethylene compound and subsequently decomposing the ozonide to obtain 3,20-pregnane-dione, brominating the dione with bromine in acetic acid to obtain the four-bromo derivative, and dehydrohalogenating the four-bromo dione with pyridine to obtain progesterone. This example provides a further illustration of the utility of the present invention, i. e. protection of the four-double bond in a steroid by hydrogenation to allow transformations in other parts of the steroid molecule without affecting the four and five-positions, the four-double bond later being regenerated. Other objects and uses of this invention will be apparent to those skilled in the art to which this invention pertains.

Conversion of a $\Delta^{4,6}$-3-ketosteroid to a three-ketosteroid by catalytic hydrogenation is known in the art. 4,6,22-ergostatrien-3-one has been reduced with hydrogen in the presence of a platinum catalyst to obtain a product which contained 22-coproergosten-3-one and 22-alloergosten-3-one, along with 4,22-ergostadien-3-one, normal and allo forms of 22-ergosten-3-ol, 22-ergostene, and other compounds, as well as the starting triene, as a difficultly separable mixture [Barton, Cox, Holness, J. Chem. Soc., 1771 (1949)]. Undoubtedly the yield of 22-coproergosten-3-one and 22-alloergosten-3-one, as well as the yields of the other compounds in the product, was relatively low because the reduction was not selective and gave a complex mixture. In contrast, the present invention provides a highly selective method for the catalytic hydrogenation of the double bonds in the four and six-positions of a $\Delta^{4,6}$-3-ketosteroid. The resulting three-ketosteroid is obtained in almost a quantitative yield, and is almost exclusively the normal form if a base is included in the reaction mixture.

According to the process of the present invention, the double bonds in the four and six-positions in a $\Delta^{4,6}$-3-ketosteroid, admixed with a solvent, are selectively hydrogenated, using between about two and about 2.2 moles of hydrogen per mole of steroid, in the presence of a palladium catalyst, to obtain nearly the theoretical amount of a three-ketosteroid which is almost exclusively the normal form if a base is used.

In carrying out the process of the present invention, a palladium catalyst is admixed with a solvent, such as, for example, ethyl acetate, methyl alcohol, ethyl alcohol, ispropyl alcohol, dioxane, tetrahydrofuran, and the like, the concept, definition, and use of a solvent being well-known in the art. Methanol is usually the preferred solvent. Normally anhydrous solvents are used; however, the presence of water, in amount up to about twenty percent of the reaction mixture by weight, usually does not lower the yield of product. The preferred solvent in any particular instance depends in part on the solubility of the starting steroid and the steroid product, the inclusion or exclusion of a base, and the temperature at which the reaction is conducted. If it is desired to obtain the normal form of a three-ketosteroid it is preferred to include a small amount of a base in the admixture if the starting steroid and the steroid product are essentially non-reactive with the base. Illustrative of the bases which may be used are the alkali-metal hydroxides, with sodium hydroxide and potassium hydroxide being preferred. However, other bases, e. g., sodium carbonate, potassium carbonate, calcium hydroxide, or the like, may be used. Preferably between about 0.1 gram and about one gram of alkali-metal hydroxide is used per liter of solvent, higher and lower concentrations also usually being operative. The admixing of catalyst, solvent, and base, if present, may be done in any order. The preferred catalyst is a palladium-charcoal catalyst. However, other palladium catalysts, such as, for example, palladium-barium sulfate, palladium-barrium carbonate, palladium-zinc carbonate, palladium-cadmium oxide, and others, are suitable. Ordinarily a five percent palladium-charcoal catalyst is used; however, a palladium-charcoal catalyst containing 0.1 percent palladium, or even less, or ten percent palladium, or even more, also gives excellent results.

The palladium catalyst is usually prereduced by agitating the admixture of catalyst and solvent, with or without added base, with hydrogen until hydrogen ceases to react. The resulting admixture containing the prereduced catalyst is admixed, in either order of addition, with the starting $\Delta^{4,6}$-3-ketosteroid, usually previously admixed with the same solvent as that present in the catalyst mixture. Then, with agitation, hydrogen in introduced until between about two and about 2.2 moles of hydrogen per mole of steroid has reacted, the selective reduction being very rapid. In most instances high yields of three-ketosteroids are obtained by admixing the solvent, the catalyst without prereduction, and the starting steroid, with or without added base, the components being admixed in any order, and then agitating the resulting admixture with hydrogen. The process is preferably carried out at about room temperature, e. g., between about fifteen and about 35 degrees centigrade, but higher and lower temperatures are also operative. The hydrogen is usually introduced at an absolute pressure of between about one and about two atmospheres, i. e., at a pressure between about equal to and about one atmosphere above standard atmospheric pressure, but lower pressures and considerably higher pressures may be employed if desired. Agitation may be by shaking, stirring, or other conventional agitation methods. Usually the double bonds in the four and six-positions are also reduced selectively in the presence of easily reducible groups other than the three-keto group. Illustratively, only the double bonds in the four and six-positions of 4,6,22-ergostatrien-3-one are reduced, the 22-double bond, as well as the three-keto group, being unaffected. If a $\Delta^{4,6}$-3-ketosteroid contains an additional group or unsaturated linkage which is more readily reduced, under the conditions of the reaction, than the four and six-double bonds, a three-ketosteroid, in which the additional group or unsaturated linkage also has been reduced, may be obtained by using the amount of hydrogen necessary to reduce the additional group or unsaturated linkage, in addition to the amount of hydrogen already specified for the reduction of the double bonds in the four and six-positions. Alternatively these more easily reducible structural groupings may be protected in a suitable manner and then later regenerated, e. g., an aldehyde group may be protected by acetal formation and later the acetal hydrolyzed to regenerate the aldehyde group.

After the reaction is complete, the crude product may be isolated, if desired, usually in a quantitative yield by simple procedure, such as, for example, acidification with an acid, illustratively acetic acid, if a base was used in the reaction, followed by filtration to remove the catalyst and any insoluble salt formed on acidification, and distillation of the solvent from the resulting filtrate, to obtain the isolated crude product.

The pure normal and allo forms of the three-ketosteroid are obtained from the isolated crude product, if desired, by simple procedure, such as, for example, by recrystallization from a suitable solvent, chromatographic adsorption using a suitable adsorbent and solvent, or other purification procedure. The combined yield of pure three-ketosteroid is usually almost the theoretical amount, the three-ketosteroid being almost exclusively the normal form if a base is included in the reaction mixture. If the product is to be used in a subsequent reaction, it is sometimes preferred not to purify the crude product since it is frequently of sufficient purity to be used as starting material for the subsequent reactions.

The following examples are illustrative of the novel selective hydrogenation processes of the present invention, but are not to be construed as limiting.

PREPARATION 1.—11α-HYDROXY-6-DEHYDRO-
PROGESTERONE

A medium is prepared of twenty grams of Edamine enzymatic digest of lactalbumin, three grams of corn steep liquor and fifty grams of technical dextrose diluted to one liter with tap water and adjusted to a pH of 4.3 to 4.5. Four liters of this sterilized medium is inoculated with *Rhizopus nigricans* minus strain, American Type Culture Collection No. 6227b, and incubated for 24 hours at a temperature of 28 degrees centigrade using a rate of aeration and stirring such that the oxygen uptake is 6.3 to seven millimoles per hour per liter of $Na_2SO_3$ according to the method of Cooper, Fernstrom and Miller, Ind. Eng. Chem., 36, 504 (1944). To this medium containing a 24-hour growth of *Rhizopus nigricans* minus strain is added two grams of 6-dehydroprogesterone, melting at 143 to 146.5 degrees centigrade, in fifty milliliters of acetone to provide a suspension of the steroid in the culture. After an additional 24-hour period of incubation under the same conditions of temperature and aeration, the beer and mycelium are extracted. The mycelium is filtered, washed twice, each time with a volume of acetone approximately equal to the volume of the mycelium and extracted twice, each time with a volume of methylene chloride approximately equal to the volume of the mycelium. The acetone and methylene chloride extracts including solvent are added to the beer filtrate. The mixed extracts and beer filtrate are extracted successively with two one-half by volume portions of methylene chloride and then with two one-fourth by volume portions of methylene chloride. The combined methylene chloride extracts are washed with two one-tenth by volume portions of a two percent aqueous solution of sodium bicarbonate and then with two one-tenth by volume portions of water. After drying the methylene chloride with about three to five grams of anhydrous $Na_2SO_4$ per liter of solvent and filtering, the solvent is removed by distillation. The residue is dissolved in a minimum of methylene chloride, filtered and the solvent then evaporated. The resulting crystals are dried and then washed four times with ten-milliliter portions of ether. The residue dissolved in 200 milliliters of benzene is chromatographed over 100 grams of alumina (washed with hydrochloric acid and heated to 120 degrees centigrade for four hours), using 200-milliliter portions of solvents as indicated in Table I, yielding a fraction, eluate solids 9 through 22 inclusive, containing 2.181 grams of crystals. This fraction is dissolved in ten milliliters of acetone, filtered and concentrated on a steam bath to a volume of six milliliters. After remaining at room temperature for one hour, 415 milligrams of crystals melting at 143 to 157 degrees centigrade are recovered by filtration. The mother liquors are refrigerated to yield an additional 281 milligrams of crystals melting at 143 to 155 degrees centigrade. The solids from this latter mother liquor, obtained by evaporation of the solvent on a steam bath, are dissolved in two milliliters of acetone. Upon the addition of two milliliters of Skellysolve B petroleum ether, boiling point range of 60 to 71 degrees centigrade, crystallization ensues and 480 milligrams of crystals melting at 152 to 157 degrees centigrade are recovered. Refrigeration of the mother liquors results in an additional lot of crystals, 76 milligrams, melting at 143 to 158 degrees centigrade. All of the recovered crystals, 1.252 grams, melting at 143 to 158 degrees centigrade, are combined and dissolved in four milliliters of methylene chloride. This solution is stirred with 0.1 gram of Magnesol magnesium silicate and filtered. The residue is washed three times with one-milliliter portions of methylene chloride and the washings are added to the main filtrate. The combined methylene chloride solution is evaporated on a steam bath to two milliliters and then four milliliters of ether is added. Crystallization begins, and after one hour at room temperature, 1.074 grams of crystals melting at 155 to 158 degrees centigrade are recovered by filtration. Upon recrystallization from five milliliters of boiling methanol and refrigeration at four degrees centigrade for two days, 456 milligrams of crystals, melting at 160 to 162 degrees centigrade are obtained by filtration. Recrystallization from three milliliters of hot methanol yields 213 milligrams of 11α-hydroxy-6-dehydroprogesterone crystals; melting point 160 to 162 degrees centigrade; $[\alpha]_D^{24}$ of plus 111 degrees (1.063 in chloroform).

*Analysis.*—Calculated for $C_{21}H_{28}O_3$: C, 76.78; H, 8.59. Found: C, 76.78; H, 8.56.

TABLE I

| Fraction | Solvent | Eluate Solids, Milligrams |
|---|---|---|
| 1, 2 | benzene | |
| 3, 4 | benzene plus 5 percent ether | |
| 5, 6 | benzene plus 10 percent ether | 264 |
| 7 | benzene plus 50 percent ether | |
| 8 | do | |
| 9, 10 | ether | |
| 11, 12 | ether plus 5 percent chloroform | |
| 13, 14 | ether plus 10 percent chloroform | 2,251 |
| 15 | ether plus 50 percent chloroform | |
| 16–18 | do | |
| 19–22 | chloroform | |
| 23 | chloroform plus 5 percent acetone | 186 |

PREPARATION 2.—11α-ACETOXY-6-DEHYDROPROGESTERONE

A 47.5-milligram sample of 11α-hydroxy-6-dehydroprogesterone is dissolved in three milliliters of acetic anhydride and two milliliters of pyridine is added. After 48 hours at room temperature, the solution is diluted to 100 milliliters with water and extracted successively with 100-, thirty-, and thirty-milliliter portions of ether. The combined ether extracts are washed with ten milliliters of water, twice with twenty-milliliter portions of one-normal hydrochloric acid, ten milliliters of water, three times with thirty-milliliter portions of seven percent sodium bicarbonate ($NaHCO_3$) solution and three times with twenty-milliliter portions of water. The ether solution is then dried over anhydrous $Na_2SO_4$ and evaporated by a stream of air. The oily residue crystallizes from 0.2 milliliter of methanol and 57 milligrams are obtained. This material is twice recrystallized from two milliliters of acetone to which ether is added drop by drop until crystals appear. Crystals of 11α-acetoxy-6-dehydroprogesterone which are recovered weigh 31.8 milligrams, melt at 142 to 144 degrees centigrade, $[\alpha]_D^{23}$ of plus 108 degrees (1.149 in 100 milliliters of chloroform).

*Analysis.*—Calculated for $C_{23}H_{30}O_4$: C, 74.56; H, 8.16. Found: C, 74.25; H, 8.17.

*Example 1.—11α-hydroxypregnane-3,20-dione and 11α-hydroxyallopregnane-3,20-dione*

A 100-milligram sample of 11α-hydroxy-6-dehydroprogesterone (Preparation 1) is dissolved in 100 milliliters of methanol containing 100 milligrams of five percent palladium-charcoal prereduced catalyst. This mixture is then hydrogenated at room temperature by shaking under a pressure of ten pounds of hydrogen (gauge pressure) in a modified Parr apparatus. The uptake of hydrogen for the two double bonds is the same as that calculated. After removal of the catalyst by filtration, the solids weigh 101 milligrams, the theoretical amount.

TABLE II

CHROMATOGRAPHY OVER FLORISIL MAGNESIUM SILICATE OF THE REDUCTION PRODUCTS OF 11α-HYDROXY-6-DEHYDROPROGESTERONE

| Fraction | Solvent | Eluate Solids, Milligrams | |
|---|---|---|---|
| 1 | ethylene chloride | A | 90.7 |
| 2-4 | ethylene chloride-acetone 25:1 | | |
| 5-7 | ethylene chloride-acetone 15:1 | | |
| 8-10 | ethylene chloride-acetone 12:1 | | |
| 11-12 | ethylene chloride-acetone 10:1 | | |
| 13 | ethylene chloride-acetone 10:1 | B | 1.4 |
| 14-16 | ethylene chloride-acetone 8:1 | | |
| 17-19 | ethylene chloride-acetone 5:1 | C | 3.0 |
| 20-22 | ethylene chloride-acetone 2:1 | D | 0.2 |
| 23-25 | acetone | | |

Chromatography in accordance with Table II of these solids in twenty milliliters of solvent over eight grams of Florisil magnesium silicate yields a main fraction containing 90.7 milligrams of a pure mixture containing only 11α-hydroxypregnane-3,20-dione and 11α-hydroxyallopregnane-3,20-dione, a yield of ninety percent of the theoretical amount. This latter fraction dissolved in thirty milliliters of acetone is then chromatographed over a mixture of five grams of a mixture of Darco G-60 activated carbon, and Celite 545 diatomaceous earth, in a one to two proportion, using thirty-milliliter portions of solvents in accordance with Table III.

TABLE III

CHROMATOGRAPHY OVER CARBON OF THE REDUCTION PRODUCTS OF 11α-HYDROXY-6-DEHYDROPROGESTERONE

| Fraction | Solvent | Eluate Solids, Milligrams |
|---|---|---|
| 1-6 | acetone | 40.5 |
| 7-9 | acetone | 9.8 |
| 10-13 | methylene chloride | 40.3 |

Three factions are obtained: fraction 1–6, 40.5 milligrams, contains only 11α-hydroxypregnane-3,20-dione; fraction 7–9, 9.8 milligrams, contains a mixture of 11α-hydroxypregnane-3,20-dione and 11α-hydroxyallopregnane-3,20-dione; and fraction 10–13, 40.3 milligrams, consists mainly of 11α-hydroxyallopregnane-3,20-dione. The yield of each form is above eighty percent assuming the hydrogenation gives equal amounts of the normal and allo forms. When twice recrystallized from a mixture of 0.15 milliliter of ethyl acetate and 0.5 milliliter of methylcyclohexane to obtain an exceedingly pure sample without regard to loss of product, fraction A yields 22 milligrams of pure crystalline 11α-hydroxypregnane-3,20-dione, melting at 106 to 110 degrees centigrade and having a characteristic infrared spectrum and microanalysis.

*Analysis.*—Calculated for $C_{21}H_{32}O_3$: C, 75.86; H, 9.70. Found: C, 75.60; H, 9.78.

When twice recrystallized from 0.5 milliliter of ethyl acetate to obtain an exceedingly pure sample without regard to loss of product, fraction C yields 23 milligrams of pure crystalline 11α-hydroxyallopregnane-3,20-dione melting at 197 to 200 degrees centigrade and having a characteristic infrared spectrum and microanalysis.

*Analysis.*—Calculated for $C_{21}H_{32}O_3$: C, 75.86; H, 9.70. Found: C, 75.51; H, 9.71.

Oxidation with chromic acid converts 11α-hydroxypregnane-3,20-dione to the known 3,11,20-pregnanetrione, and 11α-hydroxyallopregnane-3,20-dione to the known 3,11,20-allopregnanetrione.

*Example 2.—22-coproergosten-3-one*

Two grams of five percent palladium-charcoal catalyst is added at room temperature to a solution of 1.4 grams of potassium hydroxide (Reagent Grade, 85 percent) in three liters of methanol contained in a five-gallon cylindrical bottle. The air in the bottle is displaced with hydrogen, and then, with vigorous mechanical stirring, hydrogen is introduced at about one to two atmospheres absolute pressure to prereduce the catalyst. Then 12.5 grams of 4,6,22-ergostatrien-3-one [Wetter and Dimroth, Ber., 70, 1665 (1937)], melting point 107 to 109 degrees centigrade, dissolved in 750 milliliters of methanol is added. To the resulting admixture 2.0 to 2.1 mole equivalents of hydrogen is introduced at about one to two atmospheres absolute pressure using vigorous mechanical stirring, the reaction being rapid. When the selective hydrogenation reaction is complete, the mixture is acidified with acetic acid, filtered, and the solvent distilled from the resulting filtrate. The residual solid is triturated with water, filtered, and dried. The resulting white crystalline solid, approximately the theoretical amount, shows no absorption in the ultraviolet range of the light spectrum indicating complete hydrogenation of the four and six-double bonds. Infrared light absorption analysis shows that the three-keto group and the 22-double bond are unaffected. Chromatographic adsorption of the above product using Florisil magnesium silicate as the adsorbent and one percent acetone in Skellysolve B for elution gives pure 22-coproergosten-3-one; yield 79 percent of the theoretical amount; melting point 109 to 113 degrees centigrade; $[\alpha]_D^{24}$ minus five degrees in chloroform.

*Analysis.*—Calculated for $C_{28}H_{46}O$: C, 84.35; H, 11.63. Found: C, 84.37; H, 11.79.

22-alloergosten-3-one is also isolated, the yield being ten percent of the theoretical amount, melting point 163 to 167 degrees centigrade.

*Example 3.—11α-hydroxypregnane-3,20-dione*

11α-hydroxy-6-dehydroprogesterone (Preparation 1), dissolved in methanol containing 0.4 gram of potassium hydroxide per liter added, is reduced selectively with two molar equivalents of hydrogen, in the presence of a five percent palladium-charcoal catalyst, using the procedure of Example 1, to obtain the theoretical amount of crude product from which 11α-hydroxypregnane-3,20-dione, melting point 105 to 109 degrees centigrade, is isolated in a yield of about ninety percent of the theoretical amount.

*Example 4.—22-coproergosten-3-one and 22-alloergosten-3-one*

Following the procedure of Example 2, but omitting the potassium hydroxide, 4,6,22-ergostatrien-3-one is converted to the theoretical weight of product containing about equal amounts of 22-coproergosten-3-one, melting point 110 to 113 degrees centigrade, and 22-alloergosten-3-one, melting point 163 to 166 degrees centigrade, a high percentage of each being isolated.

*Example 5.—11α-acetoxypregnane-3,20-dione*

11α-acetoxy-6-dehydroprogesterone (Preparation 2) is hydrogenated selectively to give a yield exceeding eighty percent of the theoretical weight of 11α-acetoxypregnane-3,20-dione of high purity, using the procedure of Example 2.

*Example 6.—11α-acetoxypregnane-3,20-dione and 11α-acetoxyallopregnane-3,20-dione*

Selective reduction of 11α-acetoxy-6-dehydroprogesterone, dissolved in ethyl acetate, with two molar equivalents of hydrogen, in the presence of a palladium-charcoal catalyst, gives a quantitative yield of product containing about equal amounts of 11α-acetoxypregnane-3,20-dione and 11α-acetoxyallopregnane-3,20-dione, using the procedure of Example 1. Hydrolysis with sodium hydroxide in methanol, followed by oxidation with chromic acid, converts 11α-acetoxypregnane-3,20-dione to the known 3,11,20-pregnanetrione, and 11α-acetoxyallopregnane-3,20-dione to the known 3,11,20-allopregnanetrione.

*Example 7.—Coprostanone*

Following the procedure of Example 2, 4,6-cholestadien-3-one [Dane, Wang, and Schulte, Z. Physiol. Chem., 245, 80 (1936)] is hydrogenated selectively, in the presence of a palladium-zinc carbonate catalyst, to obtain a high yield of coprostanone, melting point 61 to 62 degrees centigrade.

*Example 8.—Coprostanone and cholestanone*

Using the procedure of Example 1, 4,6-cholestadien-3-one, dissolved in ethanol, is reduced with hydrogen, in the presence of a palladium-barium sulfate catalyst to obtain coprostanone, melting point 61 to 62 degrees, and cholestanone, melting point 128 to 130 degrees centigrade, the combined yields being above eighty percent of the theoretical amount.

*Example 9.—Etiocholane-3,17-dione*

Using the procedure of Example 2, 4,6-androstadien-3,17-dione [Ruzicka and Bosshard, Helv. Chim. Acta, 20, 328 (1937)] gives nearly a quantitative yield of etiocholane-3,17-dione, melting point 131 to 133 degrees centigrade, using instead of the potassium hydroxide of Example 2 an equal weight of sodium hydroxide.

*Example 10.—Etiocholane-3,17-dione and androstane-3,17-dione*

Following the procedure of Example 1, but using a palladium-charcoal catalyst which has not been prereduced with hydrogen, 4,6-androstadien-3,17-dione yields the theoretical amount of product containing four additional hydrogen atoms. Separation by chromatographic adsorption methods gives about equal amounts of etiocholane-3,17-dione and androstane-3,17-dione in high yields.

*Example 11.—Etiocholan-17β-ol-3-one*

6-dehydrotestosterone [Wettstein, Helv. Chim. Acta, 23, 388 (1940)] is reduced selectively with hydrogen, according to the method of Example 2, to obtain almost complete conversion to etiocholan-17β-ol-3-one. In the same manner 6-dehydrotestosterone 17-acetate, 17-propionate, and 17-benzoate give high yields of etiocholan-17β-ol-3-one, 17-acetate, 17-propionate, and 17-benzoate, respectively.

*Example 12.—Etiocholan-17β-ol-3-one and androstan-17β-ol-3-one*

Following the procedure of Example 1, 6-dehydrotestosterone is converted selectively to a mixture of etiocholan-17β-ol-3-one and androstan-17β-ol-3-one. About equal amounts of each is isolated, the combined yield being about 75 percent of the theoretical amount. In the same manner etiocholan-17β-ol-3-one 17-acetate, 17-propionate, and 17-benzoate and androstan-17β-ol-3-one 17-acetate, 17-propionate, and 17-benzoate are obtained in excellent yield from the appropriate 6-dehydrotestosterone 17-ester.

*Example 13.—Pregnane-3,20-dione*

Reduction of 6-dehydroprogesterone [Wettstein, Helv. Chim. Acta, 23, 388 (1940)], according to the procedure of Example 1, with two molar equivalents of hydrogen, in the presence of a palladium-charcoal catalyst, using ethanol containing 0.4 gram of sodium hydroxide per liter as the solvent, gives pregnane-3,20-dione in unusually high yield, melting point 121 to 123 degrees centigrade.

*Example 14.—Pregnane-3,20-dione and allopregnane-3,20-dione*

Hydrogenation of 6-dehydroprogesterone, according to Example 1, gives the theoretical amount of a mixture containing about equal amounts of pregnane-3,20-dione, melting point 121 to 123 degrees centigrade, and allopregnane-3,20-dione, melting point 197 to 200 degrees centigrade. A high percentage of the amount of each isomer present is recovered on isolation.

*Example 15.—Pregnane-17α,21-diol-3,11,20-trione*

4,6-pregnadien-17α,21-diol-3,11,20-trione [Mattox and Kendall, J. Biol. Chem., 188, 287 (1951)], dissolved in methanol containing 0.4 gram of potassium hydroxide per liter of methanol, is reduced selectively with two molar equivalents of hydrogen, in the presence of a five percent palladium-charcoal catalyst, using the procedure of Example 1, to obtain a nearly quantitative yield of pregnane-17α,21-diol-3,11,20-trione of high purity.

*Example 16.—Pregnane-17α,21-diol-3,11,20-trione and allopregnane-17α,21-diol-3,11,20-trione*

Following the procedure of Example 2, but omitting the potassium hydroxide, 4,6-pregnadien-17α,21-diol-3,11,20-trione is converted selectively to almost the theoretical weight of product containing about equal amounts of pregnane-17α,21-diol-3,11,20-trione and allopregnane-17α,21-diol-3,11,20-trione, a high percentage of the amount of each pure isomer present being isolated.

Example 17.—Pregnane-17α,21-diol-3,11,20-trione 21-acetate 4,6-pregnadien-17α,21-diol-3,11,20-trione 21-acetate [Mattox and Kendall, J. Biol. Chem., 188, 287 (1951)] is hydrogenated selectively to give an excellent yield of pregnane-17α,21-diol-3,11,20-trione 21 acetate, melting point 232 to 234 degrees centigrade, using the procedure of Example 2.

Example 18.—Pregnane-17α,21-diol-3,11,20-trione 21-acetate and allopregnane-17α,21-diol-3,11,20-trione 21-acetate Using the procedure of Example 1, 4,6-pregnadien-17α,21-diol-3,11,20-trione 21-acetate, dissolved in isopropanol, is reduced selectively with hydrogen, in the presence of a palladium-charcoal catalyst to obtain pregnane-17α,21-diol-3,11,20-trione 21-acetate and allopregnane-17α,21-diol-3,11,20-trione 21-acetate, the combined yield being above eighty percent of the theoretical amount.

Example 19.—Pregnane-21-ol-3,20-dione

Hydrogenation of 4,6-pregnadien-21-ol-3,20-dione [Wettstein, Helv. Chim. Acta, 23, 388 (1940); Meystre and Wettstein, Experientia, 2, 408 (1946)] according to the method of Example 2, gives an unusually high yield of pregnane-21-ol-3,20-dione. 21-acetoxy pregnane-3,20-dione is obtained in the same manner from 21-acetoxy-4,6-pregnadien-3,20-dione.

Example 20.—Pregnane-21-ol-3,20-dione and allopregnane-21-ol-3,20-dione

Following the procedure of Example 1, 4,6-pregnadien-21-ol-3,20-dione is converted to a mixture of pregnane-21-ol-3,20-dione and allopregnane-21-ol-3,20-dione. About equal amounts of each is isolated, the combined yield being almost quantitative. In the same manner 21-acetoxypregane-3,20-dione and 21-acetoxyallopregnane-3,20-dione are prepared from 21-acetoxy-4,6-pregnadien-3,20-dione.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the selective reduction of the four and six-double bonds in a $\Delta^{4,6}$-3-keto steroid selected from the group consisting of pregnadiene, cholestadiene, androstadiene, and ergostatriene, without concurrent reduction of the three-keto group, which includes the step of hydrogenating a $\Delta^{4,6}$-3-keto steroid selected from the group consisting of pregnadiene, cholestadiene, androstadiene, and ergostatriene with between about two and about 2.2 moles of hydrogen per mole of $\Delta^{4,6}$-3-ketosteroid, in the presence of a solvent and in the presence of a palladium catalyst, to obtain a three-ketosteroid having saturated carbon atoms at positions four, five, six and seven of the steroid nucleus.

2. A process for the selective reduction of the four and six-double bonds in a $\Delta^{4,6}$-3-keto steroid selected from the group consisting of pregnadiene, cholestadiene, androstadiene, and ergostatriene, without concurrent reduction of the three-keto group, which includes the step of hydrogenating a $\Delta^{4,6}$-3-keto steroid selected from the group consisting of pregnadiene, cholestadiene, androstadiene, and ergostatriene with between about two and about 2.2 moles of hydrogen per mole of $\Delta^{4,6}$-3-ketosteroid, in the presence of a solvent and in the presence of a prereduced palladium catalyst, to obtain a three-ketosteroid having saturated carbon atoms at positions four, five, six and seven of the steroid nucleus.

3. A process for the selective reduction of the four and six-double bonds in a $\Delta^{4,6}$-3-keto steroid selected from the group consisting of pregnadiene, cholestadiene, androstadiene, and ergostatriene, without concurrent reduction of the three-keto group, which includes the steps of admixing a palladium-charcoal catalyst with a solvent, which contains, per liter, between about 0.1 gram and about one gram of an alkali-metal base; introducing hydrogen into the resulting admixture to reduce the catalyst; admixing the reduced catalyst mixture with a $\Delta^{4,6}$-3-keto steroid selected from the group consisting of pregnadiene, cholestadiene, androstadiene, and ergostatriene; introducing into the resulting mixture between about two and about 2.2 moles of hydrogen per mole of $\Delta^{4,6}$-3-ketosteroid; and isolating the thus-produced three-ketosteroid having saturated carbon atoms at positions four, five, six and seven of the steroid nucleus.

4. A process for the selective reduction of the four and six-double bonds in 4,6,22-ergostatrien-3-one, without concurrent reduction of the 22-double bond and the three-keto group, which includes the step of hydrogenating 4,6,22-ergostatrien-3-one, admixed with a solvent, with between about two and about 2.2 moles of hydrogen per mole of 4,6,22-ergostatrien-3-one, in the presence of a palladium catalyst, to obtain 22-coproergosten-3-one.

5. A process for the selective reduction of the four and six-double bonds in 4,6,22-ergostatrien-3-one, without concurrent reduction of the 22-double bond and the three-keto group, which includes the step of hydrogenating 4,6,22-ergostatrien-3-one, admixed with a solvent, with between about two and about 2.2 moles of hydrogen per mole of 4,6,22-ergostatrien-3-one, in the presence of an alkali-metal base and a prereduced palladium-charcoal catalyst, to obtain 22-coproergosten-3-one.

6. A process for the selective reduction of the four and six-double bonds in 4,6,22-ergostatrien-3-one, without concurrent reduction of the 22-double bond and the three-keto group, which includes the step of admixing a palladium-charcoal catalyst with a solvent, which contains, per liter, between about 0.1 gram and about one gram of an alkali-metal hydroxide; introducing hydrogen into the resulting admixture to reduce the catalyst; admixing the reduced catalyst mixture with 4,6,22-ergostatrien-3-one; introducing into the resulting mixture between about two and about 2.2 moles of hydrogen per mole of 4,6,22-ergostatrien-3-one; and isolating the 22-coproergosten-3-one produced.

7. A process for the selective reduction of the four and six-double bonds in 6-dehydrotestosterone, without concurrent reduction of the three-keto group and the seventeen-hydroxyl group, which includes the step of hydrogenating 6-dehydrotestosterone, admixed with a solvent, with between about two and about 2.2 moles of hydrogen per mole of 6-dehydrotestosterone, in the presence of a prereduced paladium catalyst, to obtain etiocholan-17β-ol-3-one.

8. A proces for the selective reduction of the four and six-double bonds in the 4,6-pregnadiene-17α,21-diol-3,11,20-trione, without concurrent reduction of the seventeen and 21-hydroxyl groups and the three, eleven, and twenty-keto groups, which includes the step of hydrogenating 4,6-pregnadiene-17α,21-diol-3,11,20-trione, admixed with a solvent, with between about two and about 2.2 moles of hydrogen per mole of 4,6-pregnadiene-17α,21-diol-3,11,20-trione, in the presence of a prereduced palladium catalyst, to obtain pregnane-17α,21-diol-3,11,20-trione.

9. A process for the selective reduction of the four and six-double bonds in 11α-hydroxy-6-dehydroprogesterone, without concurrent reduction of the eleven-hydroxyl group and the three and twenty-keto groups, which includes the step of hydrogenating 11α-hydroxy-6-dehydroprogesterone, admixed with a solvent, with between about two and about 2.2 moles of hydrogen per mole of 11α-hydroxy-6-dehydroprogesterone, in the presence of a prereduced palladium catalyst, to obtain 11α-hydroxypregnane-3,20-dione.

10. A process for the selective reduction of the four and six-double bonds in 4,6,22-ergostatrien-3-one, without concurrent reduction of the 22-double bond and the three-keto group, which includes the steps of admixing a palladium-charcoal catalyst with a solvent; introducing hydrogen into the resulting admixture to reduce the catalyst; admixing the reduced catalyst mixture with 4,6,22-ergostatrien-3-one; introducing into the resulting mixture between about two and about 2.2 moles of hydrogen per mole of 4,6,22-ergostatrien-3-one; and isolating the 22-alloergosten-3-one produced.

11. A process for the preparation of 22-ergostene-3-one which comprises catalytically hydrogenating one mol of 4,6,22-ergostatriene-3-one admixed with a solvent with about two mols of hydrogen in the presence of an alkali-metal base and palladium-charcoal catalyst.

References Cited in the file of this patent

UNITED STATES PATENTS

| | | |
|---|---|---|
| 2,624,748 | Levin | Jan. 6, 1953 |
| 2,697,106 | Shepherd | Dec. 14, 1954 |

OTHER REFERENCES

Barton et al.: Jour. Chem. Soc. 1771 (1949).

Fieser and Fieser: National Products Related to Phenanthrene, 3rd ed., 1949, p. 421.